United States Patent [19]

Masghati et al.

[11] Patent Number: 5,029,302

[45] Date of Patent: Jul. 2, 1991

[54] FAIL SAFE GAS TUBE

[75] Inventors: Mohammad Masghati, Addison; Edwin G. Swick, Bartlett, both of Ill.

[73] Assignee: Illinois Tool Works, Glenview, Ill.

[21] Appl. No.: 574,604

[22] Filed: Aug. 29, 1990

[51] Int. Cl.[5] .......... H01H 39/00; H02H 7/24

[52] U.S. Cl. .......... 337/32; 361/119; 361/124

[58] Field of Search .......... 337/28, 29, 30, 31, 337/32, 33, 34; 361/117-126

[56] References Cited

U.S. PATENT DOCUMENTS

| | | | |
|---|---|---|---|
| 2,992,310 | 7/1961 | Babany . | |
| 3,046,536 | 7/1962 | Sciuto | 340/227 |
| 3,254,179 | 5/1966 | Howard | 200/115 |
| 3,340,431 | 9/1967 | Wanaselja . | |
| 3,522,570 | 8/1970 | Wanaselja | 337/28 |
| 3,535,779 | 10/1970 | Wanaselja | 29/622 |
| 3,755,715 | 8/1973 | Klayum et al. . | |
| 3,858,077 | 12/1974 | Bazarian et al. | 313/217 |
| 4,051,546 | 9/1977 | Scheithauer | 361/124 |
| 4,062,054 | 12/1977 | Simokat | 361/119 |
| 4,212,047 | 7/1980 | Napiorkowski | 361/124 |
| 4,303,959 | 12/1981 | Roberts et al. | 361/124 |
| 4,371,911 | 2/1983 | Baker | 361/124 |
| 4,717,902 | 1/1988 | James | 337/32 |

*Primary Examiner*—Harold Broome
*Attorney, Agent, or Firm*—Thomas W. Buckman; Donald J. Breh

[57] ABSTRACT

A fail-safe arrestor for electrical circuits utilizes a gas-filled tube to conduct at an over-voltage and also provides a clip to solidly couple the circuit to a ground lead at the melting from continuous current flow of an insulator interposed between an electrode and the ground lead, which insulator is a mesh with a plurality of passages allowing arcing between the electrode and clip at or above a predetermined voltage, and thus the ground lead, for a vented gas-filled tube.

18 Claims, 1 Drawing Sheet

Fig 1
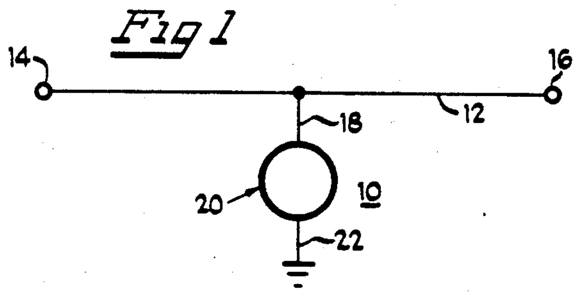
Fig 2
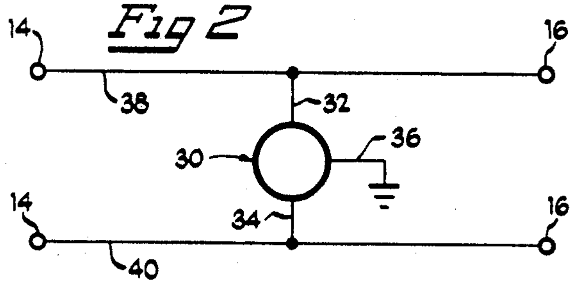
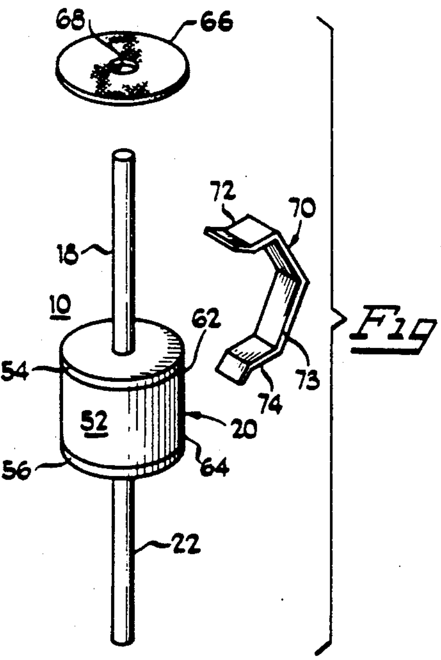
Fig 3
Fig 5
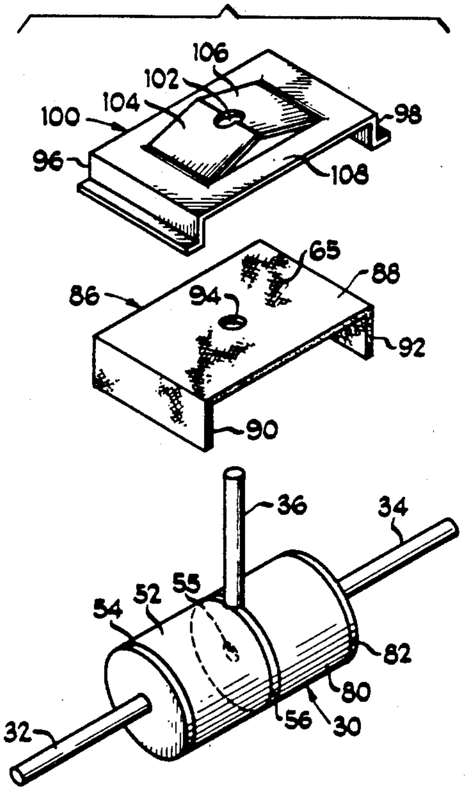
Fig 6
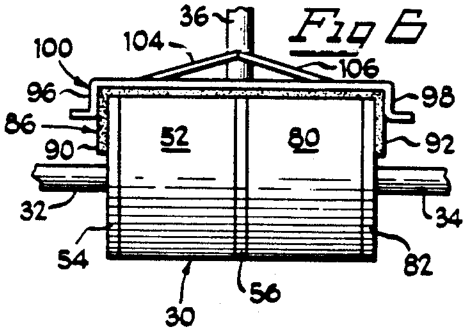
Fig 4
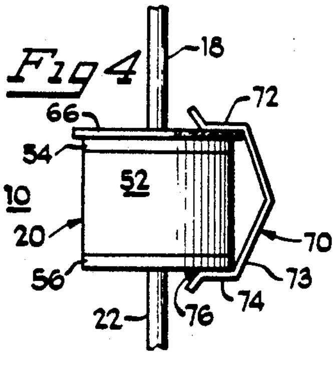
Fig 7
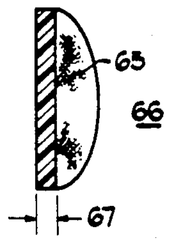

FAIL SAFE GAS TUBE

BACKGROUND OF THE INVENTION

The present invention relates to over-voltage arrestors, and, more particularly, to gas-tube arrestors incorporating a fail-safe mechanism to safely operate in the event of an over-voltage in a telecommunication line even when the gas tube is vented or at an over-temperature condition which thermally activates the fail-safe mechanism. These gas-tube arrestors are widely utilized to protect electronic equipment from an over-voltage condition caused by lighting, high-voltage line contact, and other similar circumstances.

Fail-safe gas-tubes are utilized to protect circuits from a sudden surge in the line voltage, caused by a lightning strike, or a continuous current flow at an elevated voltage from contact with a secondary power source, such as a power line. A conductor coupled between a source of current and a protectable circuit may have an arrestor coupled to it for actuation at an over-power condition for dissipation of a power surge to ground. One type of arrestor is a gas-filled tube coupled between the conductor and ground to divert or shunt the over-power in the conductor at a predetermined voltage. The gas in the tube is ionizable, and thus conductive at a predetermined voltage, to close the circuit to ground and shunt the over-power line surge. In addition, a continuous current flow through the gas-tube, as from inadvertent contact with a power line, may exceed the thermal capacity of the gas-tube leading to a fire hazard. Consequently, various thermally-activated apparatus with conductive elements have been melded with the gas-tubes to fuse or melt and solidly link the tube electrodes for continuous current flow to ground. Various fusible or meltable materials have been used to insulate the conductive elements, which insulative materials melt at temperatures correlative to power flow above a predetermined level.

Various fail-safe arrangements for electrical equipment have been provided with gas tubes and other types of protectors, such as air-gap arrestors. Exemplary of the considered problems and contingencies for the fail-safe arrangements are a sustained overload condition, such as contact with a power line, which would produce a continuous ionization of the gas tube from the passage of heavy current flows through the tube. Heavy current loads may, in fact, destroy the voltage protector, thus producing a fire hazard. A common approach to avoid this problem is to utilize a fusible element on the gas tube, which element fuses in the presence of overloads to permanently short circuit the arrestor and release another mechanism, such as a spring-loaded shorting bar, for coupling to ground and continuous protection from the overload. The permanent short-and-ground condition implies a condition requiring inspection and/or replacement of any damaged components as well as repair of the condition producing the continuous short. Examples of such fail-safe protection devices are illustrated in U.S. Pat. Nos. 3,254,179; 3,340,431; and 3,522,570.

The above-noted fusible elements are generally a metallic material, which forms an electrically conductive path to short circuit the arrestor or gas-tube electrodes. The particular choice of materials for such fusible component is dictated by the properties of the metal, including its thermal conductivity. An altenative structure in U.S. Pat. No. 4,212,047 to Napiorkowski utilizes a fusible material, which is an electrical insulator, interposed between one or more of the electrodes in a shorting mechanism. This apparatus is particularly directed to thermal conditions for direct short circuiting after fusing of the insulative material. Among the class of materials taught in this patent are certain fluoroplastics, including fluorinated ethylene propylene polymer ["FEP"]. These materials are solid components and provide no communication between the electrodes without complete fusion of the fusible member.

A gas-tube with a temperature-responsive device is provided in U.S. Pat. No. 4,717,902 to James, and utilizes a coated apparatus to short circuit an electrical conductor at an over-temperature condition. More specifically, a conductive element has a coating, such as a varnish, which decomposes at an elevated temperature and allows contact between electrodes of the shorting apparatus for conduction of the over-current or over-voltage condition to ground. The conducting members are illustrated and taught as spring-tempered components.

An excess voltage arrestor with a coated wire interwoven between several electrodes of an arrestor is shown in U.S. Pat. No. 4,371,911 to Baker. At a continous over-voltage or over current condition, the sleeve material surrounding a conductive element is melted sufficiently to provide the tensed, interwoven element to expand through the softened insulating material and contact the electrodes to provide a continuous short-circuit. Similar meltable materials on wound wire elements are illustrated in U.S. Pat. No. 2,992,310 to Babany and U.S. Pat. No. 3,046,536 to Sciuto. In these applications, the apparatus are utilized for fire alarm energizing apparatus with a thermo-plastic wrap or insulating material on the wiring, which wrap is meltable at a specific or predetermined temperature.

Gas-tube arrestors may be inadvertently vented, which effectively relegated them to air-gap insulators. Therefore, it has been found desirable to provide an assembly providing continuous conduction across the electrodes at a thermal overload, as well as providing an ionizable chamber to conduct during small line surges, and further providing conduction through the fail-safe mechanism in the event of inadvertent venting of the gas-tube enclosure or body.

SUMMARY OF THE INVENTION

A fail-safe arrestor for an electrical circuit has an ionizable gas-tube chamber operable between at least one pair of electrodes to provide a protective component for diverting or short-circuiting an over-voltage condition adequate to ionize the gas in the tube and conduct the current to ground. The arrestor includes a fail-safe clip arrangement operable to couple the electrodes for continuous current-carrying to ground in the event that the ionizable gas has been vented from the tube, or at a thermally-activated condition induced by a continous over-voltage and over-current status, which protects the downstream components in the electical circuit at either condition. At an over-voltage condition acting on a vented gas-tube, an insulative mesh material between the conducting clip and the tube electrodes is operable to permit arcing through holes in the mesh insulator at a predetermined voltage. Thus, even at venting of the gas-tube and without complete destruction of the insulating material the downstream circuit is protected by a ground arrangement through the fail-safe apparatus.

The arrestor has a gas-tube with at least an electrode at either end and a conductive clip or coupling device arranged to couple the conductive leads at a thermally actuated condition. The mesh isulator is inserted between at least one of the clip ends and the associated electrode to insulate against direct contact between the electrode and clip end, but permitting an over-voltage condition to conduct through the holes of the mesh in the event of a vented gas tube and the loss of the ionizable gas. In an AC power line crossing condition, that is a continuous over-voltage induced for a long period of time, the mesh material is meltable to allow the conducting clip to directly couple the gas-tube electrodes for continuous conduction to ground through a solid link, which is better adapted to and a more prudent method of carrying larger currents and voltages at a continuous level without fire hazards. Thus, the vented condition of a gas-tube is no longer a limitation to continuous protection of a circuit and the apparatus is not limited to acting as only a thermal actuator or safety device.

BRIEF DESCRIPTION OF THE DRAWING

In the Figures of the drawing, like reference numerals identify like components, and in the drawing:

FIG. 1 is a schematic circuit illustration with a two-element fail-safe gas tube;

FIG. 2 is a schematic circuit drawing with a three-element, fail-safe gas-tube;

FIG. 3 is an exploded view of a representative two-element, fail-safe gas-tube assembly of the present invention;

FIG. 4 is an elevational view of the fail-safe assembly in FIG. 3;

FIG. 5 is an exploded view of an alternative embodiment of the fail-safe mechanism utilizing a three-element fail-safe gas-tube;

FIG. 6 is an elevational view of the fail-safe assembly in FIG. 5; and

FIG. 7 is a cross-sectional and perspective view of a representative mesh insulator.

DETAILED DESCRIPTION OF THE PREFERRED EMBODIMENT

Fail-safe, gas-tube apparatus or arrestors are utilized to protect electrical circuits from over-voltage conditions such as lightning strikes, or power line surges. A typical gas-tube arrangement in a circuit is schematically illustrated in FIG. 1 with gas-tube arrangement 10 coupled to conducting line 12 connected between input end 14 and output end or circuit 16. Gas-tube arrangement 10 has sealed gas-tube 20 with conducting lead 18 and ground lead 22 extending in opposed directions. Gas tube 20 is generally sealed and has a gas component, which is ionizable at an over-voltage condition in line 12, to close the circuit between line 12 and ground through leads 18 and 22 and tube 20, which provides a safety arrangement or shunt for an over-voltage in line 12 and avoids damage to circuit 16. In FIG. 2, three-element gas-tube 30 is coupled to conducting lines 38 and 40 by electrodes 32 and 34, respectively, which tube 30 and thus lines 38 and 40 are each couplable to grounding lead 36 for protection of both of circuits 16 and 17. The gas tubes or gas-tube conductors 20 and 30 are conductive at ionization of the gas retained within the tubes, which provides a conducting circuit at an elevated voltage. However, venting or leakage of this ionizable gas from the enclosed tube will inhibit or prohibit conduction through the vented tube.

Two-element fail-safe gas-tube arrestor 10 is illustrated in an exploded view in FIG. 3 and in the as-assembled state in FIG. 4. In this embodiment, arrestor 10 has sealed tube or body 20 with chamber 52 filled with an ionizable gas, such as neon. Electrodes 54 and 56 with respective protruding leads 18 and 22 for connection to the circuit and ground, respectively, are mounted on tube ends 62 and 64. Fail-safe clip 70 provides a solid, continous conducting link between electrodes 54 and 56 and has contact ends 72 and 74 joined by arm 73, which arm is resilient for slight displacement and recovery of ends 72, 74 to tightly grip tube 20 at electodes 54 and 56. Insulating mesh screen 66 is matable with protruding lead 18 extending through central port 68 and overlays electrode 54 to insulate electrode 54 from direct contact with clip 70 at a reference state. As shown in FIG. 4, mesh screen 66 is positioned at tube first end 62 between electrode 54 and first clip end 72, which insulates electrode 54 and prevents conduction through clip 70 at normal operating voltages and currents. Mesh 66 is interposed between clip 70 and at least one of electrodes 54 and 56 to insulate against conduction, but the other of electrodes 54 and 56 may be coupled directly to clip 70, such as by soldering or welding, or it may be similarly provided with an insulating mesh 66. In the illustrated embodiment of FIG. 4, clip 70 may be any conductive material with the requisite electrically conductive and physically resilient characteristics to grip tube 20, such as stainless steel or phosphor-bronze.

Insulating screen mesh 66, such as a nylon mesh, will conduct or permit arching through holes or passages 65 of the mesh to clip 70 at clip end 72 at voltages above a predetermined voltage, which clip 70 conducts to second electrode 56 and consequently to ground. Further, at a continuous over-voltage and over-current condition, as from inadvertent contact with a power line, the gas tube is operable to conduct through ionization of the gas in chamber 52. However, the continuous power flow will melt insulating mesh screen 66 and permit direct contact between clip end 72 and electrode 54, which provides a solid link to accommodate continuous current flow from a conducting line 12 to ground without concern for damage to or venting of gas tube 20. In addition, a small bead 76 of adhesive, such as cyanoacrylate adhesive, may be provided between second clip end 74 and electrode 56 to secure clip 70 and/or to provide a small insulative film at the second clip end.

In the alternative embodiment of FIG. 2, a three-element gas-tube 30 is coupled between two conducting lines 38 and 40. An exploded view of three-element gas-tube 30 in FIG. 5, which is shown as-assembled in FIG. 6, has first electrode 54 with conducting lead 32, second electrode 56 with conducting lead 36, and first gas chamber 52 therebetween. Second gas chamber 80 is similarly coupled between second electrode 56 and third electrode 82 with conducting lead 34. Each of chambers 52 and 80 are filled with an ionizable gas for conduction of current at ionization through leads 32 and 34, respectively, to second electrode 56 and conducting lead 36, which is coupled to ground. Chambers 52 and 80 openly communicate though electrode 56 by any means such as passage 55, which is in dashed outline, in electrode 56. Thus, ionization of the gas in either of chambers 52 or 80 results in gas ionization throughout both chambers 52, 80. However, there is no measurable conduction to the opposed electrode, which has a significant resistance of impedance as compared to the grounded electrode 56, which has almost no resistance.

Insulating mesh screen 86 is operable to insulate fail-safe clip 100 from electrodes 54 and 56 at a reference state, and it has upper wall 88 and foled sidewalls 90 and 92 at its ends to overlay electrodes 54 and 82, respectively. Insulator 86 is positioned on tube 30 with ground electrode lead 36 extending through aperture 94 and sidewalls 90 and 92 positioned between the first and second ends 96 and 98 of fail-safe clip 100. Clip 100, which can conduct directly from electrodes 54, 82 to ground lead 36, is mounted over mesh 86 and resiliently grasps tube 30 between clip ends 96 and 98. Ground electrode lead 36 extends through port 102 of clip 100 and directly contacts prongs or tongues 104 and 106, which are deflectable from upper wall 108 to recover and maintain positive contact with lead 36. As a production and manufacturing consideration or expedient, arms 104, 106 may be directly coupled to extending lead 36, such as by soldering or welding. Thus, leads 32 and 34 are connectable to separate circuits or conducting lines 38, 40 and are operable to protect separate circuit lines with a common gas-tube 30 by shunting or shorting current flow between either or both of electrodes 54 and 82 ground electrode 56. Insulating mesh screen 86 is operable at both of electrodes 54 and 82 to insulate clip 100, but allows arcing through the mesh holes or pores 65 at elevated voltages after inadvertent venting of chambers 52 and 80 and it is meltable during a continuous over-voltage and current flow situation for direct coupling of fail-safe clip 100 to the respective electrodes 54, 82 and ground electrode 56 and lead 36. Insulator screens 66 and 86 in the illustrated embodiments are shown as a single thickness component, however, the thickness or wall 67 in FIG. 6 may be provided as a laminate structure. The laminate continues to provide the necessary wall thickness for control of voltage arc conduction therethrough, but the multiple or laminate arrangement allows fail-safe clips 70, 100 to be more easily mounted without disturbing the insulator position at the electrode. In FIG. 6, a preferred embodiment of nylon mesh insulator 66 has a thickness of approximately 0.003 in. with a hole size of approximately 70 microns on a side within the mesh network. The resultant generally rectangular passages 65 have a cross-sectional area of about 4900 square microns. It is through these holes and the narrow thickness that voltage will arc to the respective clips 70–100 and thus to ground leads 22, 36 at a tube-vented and over-voltage condition. The shape of the holes is only illustrative and not a limitation.

While only particular embodiments of the invention have been described and claimed herein, it is apparent that various modifications and alterations of the invention may be made. It is therefore the intention in the appended claims to cover all such modifications and alterations as may fall within the true spirit and scope of the invention.

What is claimed is:

1. A fail-safe arrestor operable with a current-carrying conductor for protection of components in a circuit, said arrestor comprising:

at least one gas-filled enclosure, which is ionizable to conduct eletricity;

at least a first electrode and a second electrode coupled to said enclosure and having a discharge gap therebetween in said enclosure;

means for short circuiting positioned for coupling at least two of said electrodes;

one of said electrodes couplable to ground and each of the other of said electrodes couplable to a circuit;

at least one layer of an insulating mesh component interposed between said short-circuiting means and at least one of said electrodes, said mesh defining a plurality of passages and operable to conduct through said passages at an enclosure vented condition before melting of said mesh to couple said short-circuiting means and said electrodes for protection of said current-carrying line and circuit.

2. A fail-safe arrestor as claimed in claim 1 wherein said mesh material is nylon.

3. A fail-safe arrestor as claimed in claim 1 wherein said means for short circuiting is a clip having a first finger, a second finger and a flexing arm connecting said first and second fingers, one of said first and second fingers in proximity to one of said first and second electrodes and the other of said first and second fingers in proximity to the other of said first and second electrodes;

said mesh material component interposed between at least one of said fingers and said proximal electrodes.

4. A fail-safe arrestor as claimed in claim 1 wherein said mesh material has a first predetermined wall thickness with a plurality of passages therethrough, said mesh material operable to inhibit arcing and conduction through said mesh passages below a predetermined voltage and operable to permit arcing through said mesh passages at and above said voltage.

5. A fail-safe arrestor as claimed in claim 4 wherein said mesh material is a multi-ply laminate structure.

6. A fail-safe arrestor as claimed in claim 5 wherein said mesh material laminate comprises a first layer of insulating mesh material and a second layer of insulating mesh material, each of said first and second layers having a wall thickness, said first and second layer wall thicknesses cooperate to provide a laminated array with a wall thickness operable to provide said insulating characteristic correlative to a voltage and permitting arcing through said mesh layers at and above said voltage.

7. A fail-safe arrestor as claimed in claim 3 wherein said other of said first and second fingers is anchored to said other of said first and second electrodes by an insulating adhesive.

8. A fail-safe arrestor as claimed in claim 7 wherein said adhesive is a cyanoacrylate adhesive.

9. A fail-safe arrestor as claimed in claim 3 wherein said clip is stainless steel.

10. A fail-safe arrestor as claimed in claim 1 further comprising a third electrode interposed in said enclosure and gas-filled gap between said first and second electrode;

said short circuiting means positioned for coupling each of said first and second electrodes with said third electrode;

said insulating mesh component interposed between each of said first and second electrodes to insulate said short circuiting means from said third electrode at a normal operating condition.

11. A fail-safe arrestor as claimed in claim 10 wherein said short circuiting means is a clip having a first finger, a second finger and an arm connecting said fingers, said arm having a port;

said third electrode having a conducting lead extending through said port and contacting said clip;

said first finger positioned to contact one of said first and second electrodes, and said second finger positioned to contact the other of said first and second electrodes, said mesh component interposed between each of said respective fingers and electrodes to insulate said arrestor at a reference position.

12. A fail-safe arrestor as claimed in claim 10 wherein said mesh component is a nylon mesh.

13. A fail-safe arrestor as claimed in claim 11 wherein said clip further comprises a first tongue and a second tongue, which first and second tongues cooperate to define said port;

said first and second tongues deflectable and resilient to recover to maintain positive contact with said electrode lead extending through said port.

14. A fail-safe arrestor for an electrical circuit, said arrestor comprising:

a housing with a first end, a second end and a chamber, which chamber is filled with an ionizable gas for electrical conduction;

a first electrode with a conducting lead mounted at one of said first and second housing ends, and a second electrode mounted at the other of said housing ends, said first and second electrodes coupled to said ionizable gas;

a nylon mesh insulator positionable at one of said electrodes;

a fail-safe clip with a first finger, a second finger and an arm coupling said first and second fingers, said arm deflectable to mount said clip on said housing with one of said first and second fingers positioned at one of said first and second electrodes to secure said insulator on said one electrode and the other of said first and second fingers contacting the other of said first and second electrodes, one of said first and second electrodes coupled to ground and the other of said electrodes coupled to said circuit, said clip providing a solid conducting link between said first and second electrodes to provide communication to ground at one of an over-voltage condition communicated through said insulator and at melting of said insulator.

15. A fail-safe arrestor as claimed in claim 14 wherein said nylon mesh is a laminate having at least a first layer and a second layer.

16. A fail-safe arrestor for an electrical circuit, said arrestor comprising:

a housing with a first end, a second end and a chamber;

a first electrode at one of said first and second ends, a second electrode at the other of said first and second housing ends, and a third electrode positioned in and dividing said chamber into a first cavity and a second cavity, which third electrode defines at least one through-passage communicating between said first and second cavities;

each of said first and second cavities being sealed and filled with an ionizable gas;

said first and second electrodes coupled to said ionizable gas in said first and second cavities, respectively, a fail-safe clip having an upper wall with a first contact finger and a second contact finger, which clip fingers grasp and retain said housing at said first and second electrodes, and said third electrode contacting said clip to selectively couple said first and second electrodes with said third electrode and provide a continuous link between said electrodes; and, a mesh insulator having a first insulating end and a second insulating end, which insulator is interposed between said clip and said housing with one said first and second insulating ends positioned between one of said first and second contact fingers and its contacting electrode, and the other of said first and second insulator ends positioned between the other of said first and second contact fingers and its contacting electrode, with insulator conducts between an electrode and clip finger at an elevated voltage and vented cavity condition, and is meltable to provide direct coupling between a contact finger and electrode at a continuous power flow to said arrestor for coupling a circuit at an electrode and finger to ground.

17. A fail-safe arrestor as claimed in claim 16, wherein said mesh insulator is a nylon mesh having a sieve-like network with passages, which passages, have a cross-sectional area of about 4900 square microns.

18. A fail-safe arrestor as claimed in claim 3 wherein said clip is phosphor-bronze.

* * * * *